United States Patent
Canavan

[19]

[11] Patent Number: 5,946,072
[45] Date of Patent: Aug. 31, 1999

[54] ANGULAR ADJUSTMENT CONSTRUCTION FOR TEMPLE BAR

[75] Inventor: Richard W. Canavan, Woodstock, Conn.

[73] Assignee: Bacou USA Safety, Inc., Smithfield, R.I.

[21] Appl. No.: 09/044,367

[22] Filed: Mar. 19, 1998

[51] Int. Cl.[6] ................................................ G02C 1/02
[52] U.S. Cl. ......................... 351/120; 351/110; 351/111
[58] Field of Search .................................. 351/120, 111, 351/110, 115, 156, 157, 105, 106, 41; 2/450, 451; 16/228

[56] References Cited

U.S. PATENT DOCUMENTS

| | | |
|---|---|---|
| 1,252,126 | 1/1918 | Letzeisen . |
| 1,998,070 | 4/1935 | Bishop . |
| 3,189,912 | 6/1965 | Miller . |
| 3,841,741 | 10/1974 | Vischer, Jr. . |
| 3,846,018 | 11/1974 | Gerson . |
| 4,129,362 | 12/1978 | Lorenzo . |
| 4,527,291 | 7/1985 | Nussbickl . |
| 4,843,655 | 7/1989 | Hegendorfer . |
| 4,986,650 | 1/1991 | Wilhelmi . |
| 5,035,498 | 7/1991 | Bolle Robert . |
| 5,357,292 | 10/1994 | Wiedner . |
| 5,457,503 | 10/1995 | Chen . |
| 5,457,505 | 10/1995 | Canavan et al. . |
| 5,530,490 | 6/1996 | Canavan . |
| 5,565,937 | 10/1996 | Lee . |
| 5,638,147 | 6/1997 | Wang-Lee . |
| 5,659,381 | 8/1997 | Simioni ................................ 351/120 |
| 5,661,535 | 8/1997 | Wang ................................... 351/120 |

*Primary Examiner*—Hung Xuan Dang
*Attorney, Agent, or Firm*—Salter & Michaelson

[57] ABSTRACT

An eyeglass assembly has a rearwardly projecting side portion, a temple bar having a U-shaped body with inner and outer legs and a connecting leg disposed therebetween, and an angular adjustment construction for releasably and angularly mounting a temple bar to the side portion. The angular adjustment construction comprises an opening formed in the side portion, the opening having at least two side-by-side portions with a reduced dimension restriction element therebetween. A pin is formed on the outer leg of the U-shaped body of the temple bar. A serrated surface is formed on the rear edge of the side portion, and an engagement member is formed on an inwardly facing surface of the connecting leg of the U-shaped body of the temple bar. The engagement member of the temple bar engages the serrated surface of the side portion upon inserting the pin within one of the opening portions and moving the pin from one of the opening portions through the restriction element to the adjacent opening portion to secure the pin and temple bar in place.

11 Claims, 5 Drawing Sheets

5,946,072

ANGULAR ADJUSTMENT CONSTRUCTION FOR TEMPLE BAR

BACKGROUND OF THE INVENTION

The instant invention relates generally to eyewear, and more particularly to an eyeglass assembly having a rearwardly projecting side portion, a temple bar, and a novel angular adjustment construction in which a serrated surface and an engagement member that provide angular adjustment are engaged with one another by snap-fittingly attaching the temple bar to the side portion.

Angular adjustment constructions for attaching temple bars to either frames or lenses in eyeglasses are well known in the art. Representative of such prior art are U.S. Pat. Nos.: 1,252,126 to Letzeisen; 1,998,070 to Bishop; 3,189,912 to Miller; 3,841,741 to Vischer, Jr.; 3,846,018 to Gerson; 4,129,362 to Lorenzo; 4,527,291 to Nussbickl; 4,843,655 to Hegendörfer; 4,986,650 to Wilhelmi; 5,035,498 to Bollé Robert; 5,357,292 to Wiedner; 5,457,503 to Chen; 5,457,505 to Canavan et al.; 5,530,490 to Canavan; 5,565,937 to Lee; and 5,638,147 to Wang-Lee.

SUMMARY OF THE INVENTION

The instant invention provides a novel and effective eyeglass assembly having a rearwardly projecting side portion, a temple bar having a U-shaped body with inner and outer legs and a connecting leg disposed therebetween, and an angular adjustment construction for releasably and angularly mounting a temple bar to the side portion. The angular adjustment construction comprises an opening formed in the side portion, the opening having at least two side-by-side portions with a reduced dimension restriction element therebetween. A pin is formed on the outer leg of the U-shaped body of the temple bar. A serrated surface is formed on the rear edge of the side portion, and an engagement member is formed on an inwardly facing surface of the connecting leg of the U-shaped body of the temple bar. The engagement member of the temple bar engages the serrated surface of the side portion upon inserting the pin within one of the opening portions and moving the pin from one of the opening portions through the restriction element to the adjacent opening portion to secure the pin and temple bar in place.

More specifically, the opening includes a first opening portion positioned adjacent the rear edge of the side portion and a second opening portion positioned adjacent the first opening portion along a generally horizontal axis. The pin has a radially outwardly projecting detent portion extending along a generally vertical axis, the pin being received within the opening upon rotating the temple bar from its normal operating position in which it generally parallels the horizontal axis and aligning the pin with the first opening portion and the detent portion with the second opening portion, and, upon rotating the temple bar back to its operating position after the pin is received within the opening, the pin being snap-fittingly moved from the first opening portion to the second opening portion through the restriction element. Preferably, the restriction element has a diameter less than the diameter of the pin.

Accordingly, the primary object of the instant invention is the provision of a protective eyeglass assembly having a rearwardly projecting side portion, a temple bar, and a novel angular adjustment construction which positively engages a serrated surface of the side portion with an engagement member of the temple bar. Another primary object is the provision of a novel angular adjustment construction that is simple in design and easy to assembly.

Further additional objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
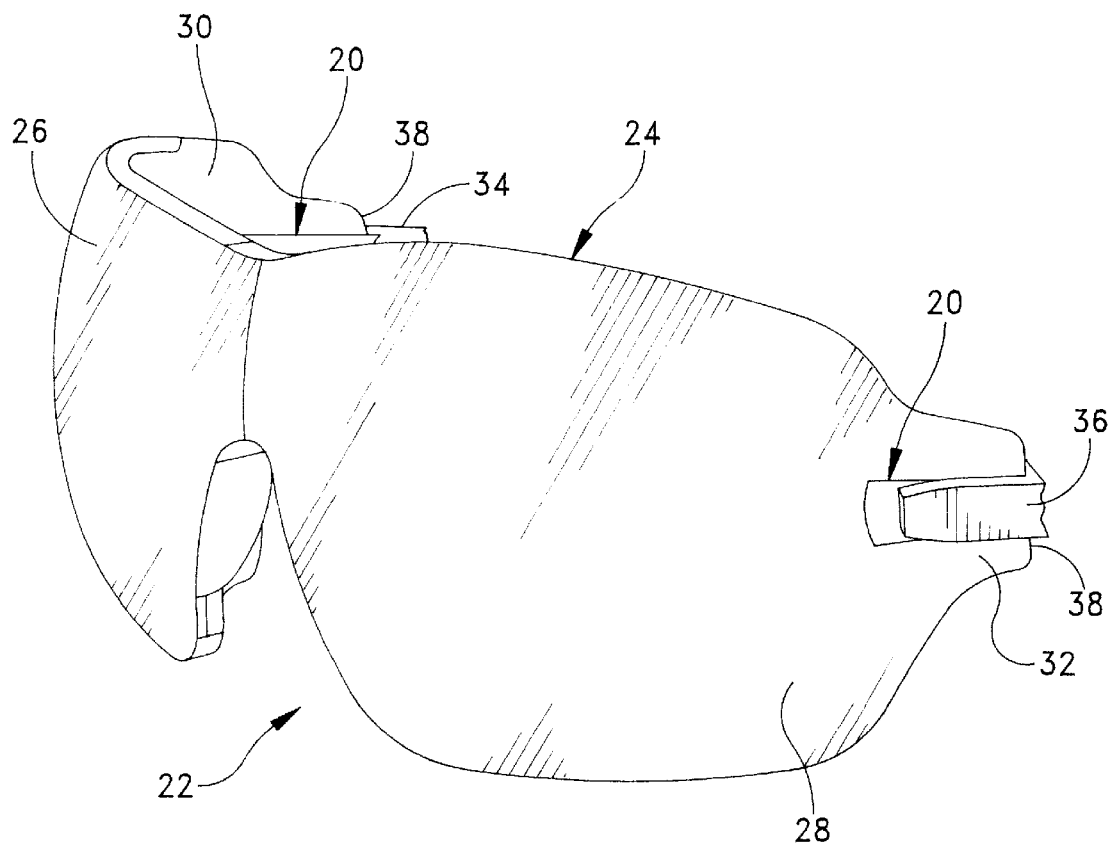
FIG. 1 is a fragmentary perspective view of an eyeglass assembly having the novel angular adjustment construction of the present invention for attaching a temple bar of the eyeglass assembly to a side portion of thereof.

Referring now to the drawings, and more particularly to FIG. 1, there is generally indicated at 20 a novel angular adjustment construction of an eyeglass assembly, which is generally indicated at 22. The eyeglass assembly 22, in addition to the angular adjustment construction 20, comprises a lens assembly, generally indicated at 24, having a pair of lenses 26, 28 which, as shown, are integrally formed with one another. It should be noted that the principles of the present invention can be applied to the construction 20 where a frame (not shown) is utilized and the lenses are secured to the frame in the well known manner. The lens assembly 24, or frame, if applicable, further includes, for each lens 26, 28, respective rearwardly projecting side portions 30, 32 and temple bars 34, 36 which are attached to their respective side portions 30, 32 by the angular adjustment construction 20. Each side portion 30, 32 includes a generally vertical rear edge 38, the purpose of which will be described in greater detail as the description of the construction 20 proceeds.

Figure 4:
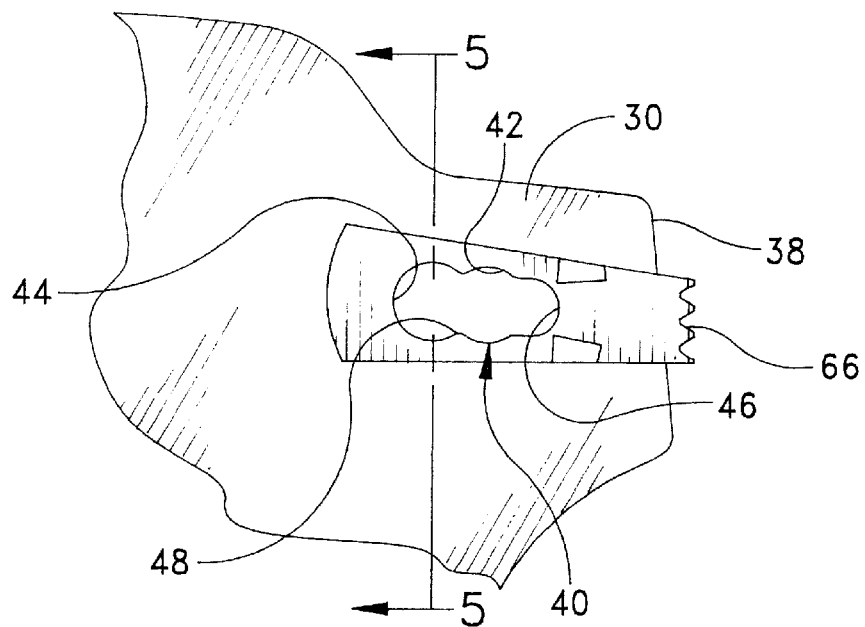
FIG. 4 is an elevational view of the side portion.
Figure 5:
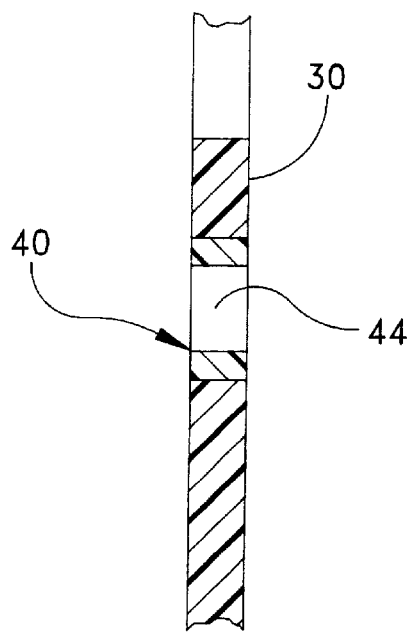
FIG. 5 is a cross-sectional view of the side portion taken along line 5—5 in FIG. 4.

Turning now to FIGS. 2–5, the left side portion 30 and the left temple bar 34 are shown for illustrative purposes. In this regard, it should be noted that the construction 20 is identical for the right side portion 32 and the right temple bar 36 as well. The angular adjustment construction 20 includes an opening, generally indicated at 40, formed in the left side portion 30 of the lens assembly 24. The opening 40 has three side-by-side portions, namely, a middle opening portion constituting a first opening portion 42 of the opening, a far end opening portion spaced furthest away from the rear edge 38 of the side portion 30 constituting a second opening portion 44, and a near end opening portion (adjacent the rear edge 38) constituting a third opening portion 46. As shown in FIG. 4, there is a reduced dimension restriction element 48 disposed between the first opening 42 and the i second opening 44. The purpose of the restriction element 48 will become apparent as the description of the angular adjustment construction 20 continues.

Figure 2:
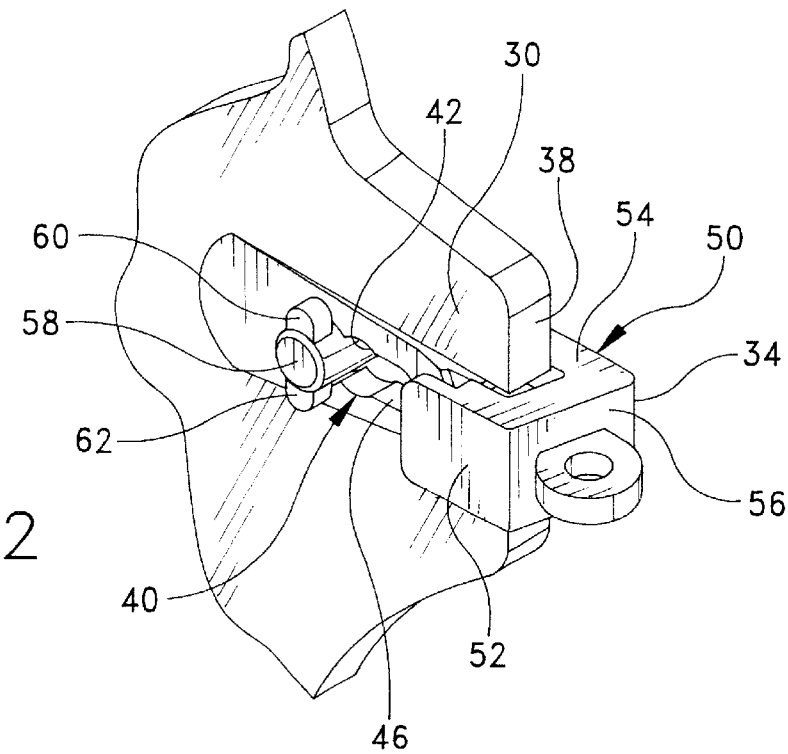
FIG. 2 is an enlarged fragmentary perspective view of the angular adjustment construction illustrated in FIG. 1.
Figure 3:
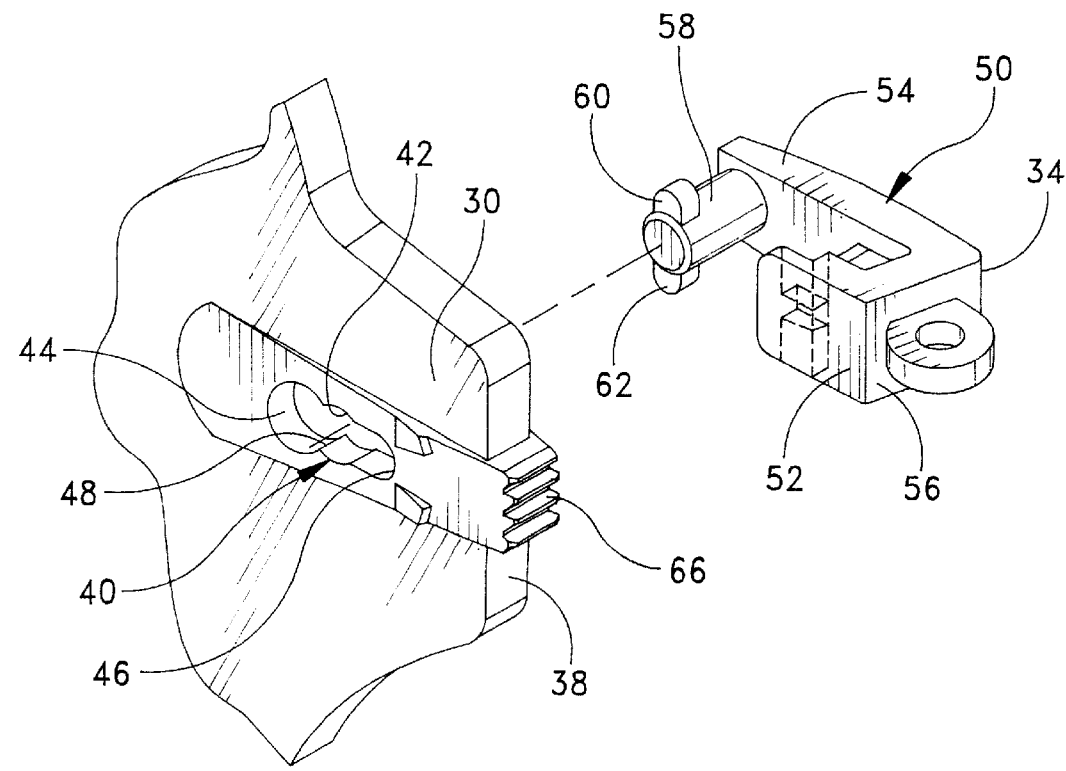
FIG. 3 is an exploded perspective view similar to FIG. 2 illustrating the temple bar spaced from the side portion prior to its attachment to the side portion.
Figure 6:
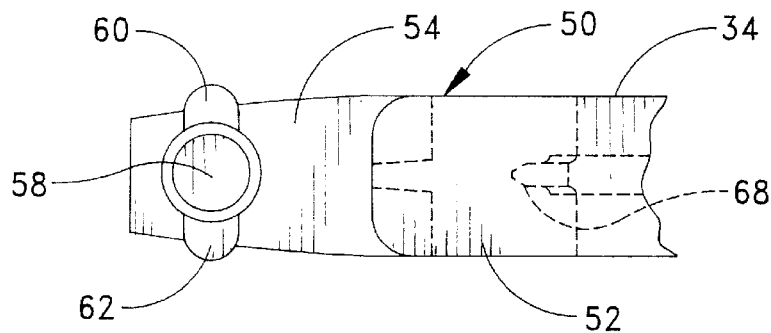
FIG. 6 is an elevational view of an end of the temple bar.
Figure 7:
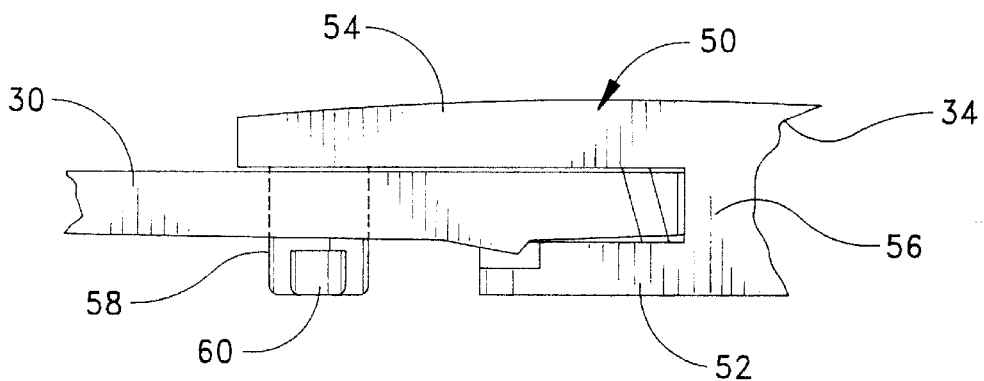
FIG. 7 is a top plan view of the angular adjustment construction illustrated in FIG. 2.
Figure 8:
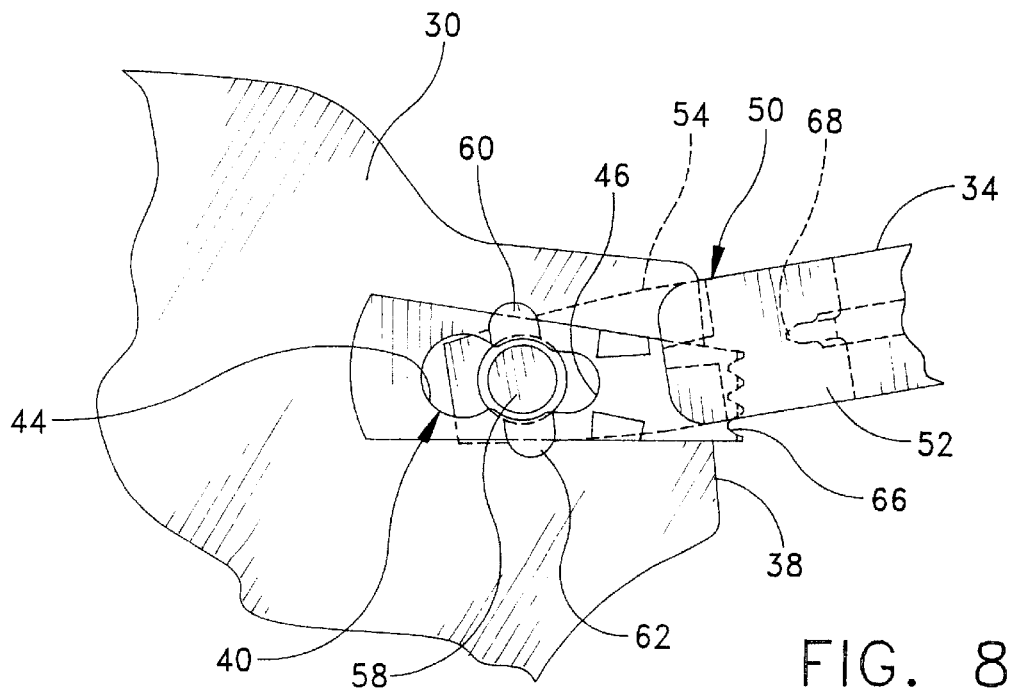
FIG. 8 is an elevational view of the angular adjustment construction illustrating the attachment of the temple bar to the side portion after a pin of the temple bar has been inserted into an opening of the side portion.

Referring now to FIGS. 2, 3 and 6–8, the left temple bar 34 has a generally U-shaped body generally indicated at 50 with inner and outer legs 52, 54 and a connecting leg 56 disposed therebetween. The outer leg 54 of the U-shaped body 50 has a perpendicularly projecting pin 58 which is adapted to project through the first: opening portion 42 of the opening 40 when attaching the left temple bar 30 to the left side portion 30. As shown, the pin 58 has a pair of radially outwardly projecting detent portions 60, 62 which extend along a generally vertical axis (FIG. 6). As shown in FIG. 2, the U-shaped body 50 maintains a position along the horizontal axis during operation. However, to attach the U-shaped body 50 of the left temple bar 34 to the left side portion 30, the U-shaped body 50 (and the pin 58 and the detents 60, 62) are rotated counter clockwise approximately ninety degrees so that the pin 58 is aligned with the first opening portion 42 and the detent portions 60, 62 are aligned with the second and third opening portions 44, 46, respectively. In this position, the pin 58 can be inserted completely into the opening 40. It should be noted that the inner leg 52 of the U-shaped body 50 is shorter than the outer leg 54 having the pin 58, and thus, by virtue of the body 50 being rotated, is spaced from the left side portion 30 and does not interfere with the body's attachment to the left side portion.

The pin 58 and the detent portions 60, 62 are inserted into the opening portions 42, 44 and 46, respectively, until the detent portions 60, 62 clear the inner surface 64 (FIG. 7) of the left side portion 30. At this point the left temple bar 34 can be rotated back to its operating position.

Referring now to 4 and 6–10, the rear edge 38 of the shown left side portion 30 (and the right side portion 32 as well) of the lens assembly 24 has a serrated surface 66 formed thereon. The inwardly facing surface of the connecting leg 56 of the U-shaped body 50 of the left temple bar 34 has an engagement member 68 formed thereon. The serrated surface 66 has a plurality of horizontally disposed serrations (not designated) which are sized to mesh with the engagement member 68 upon placing the engagement member 68 into contact with the serrated surface 66. The serrated surface 66 and the engagement member 68 are provided for enabling the angular adjustment of the temple bars 34, 36 relative to the side portions 30, 32 of the lens assembly 24 and for temporarily locking the temple bars 34, 36 in place at a desired angle. It should be observed that the serrated surface can be located on the inner surface of the connecting leg 56 of the body 50 and the engagement member on the rear edge 38 of the side portion and still fall within the scope of the present invention.

Figure 9:
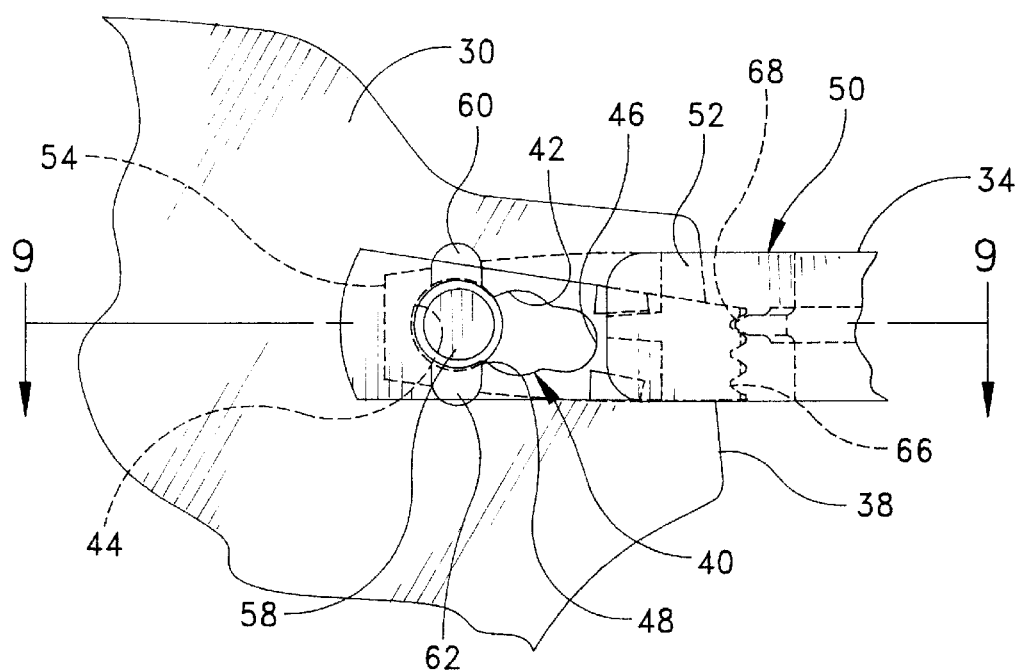
FIG. 9 is an elevational view similar to FIG. 8 illustrating the temple bar snap-fittingly secured to the side portion.
Figure 10:
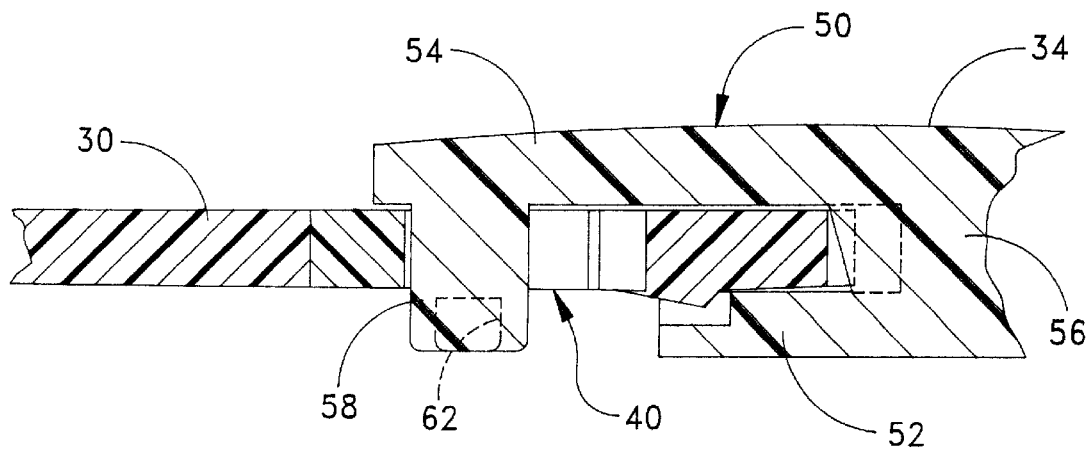
FIG. 10 is a cross-sectional view of the angular adjustment construction taken along line 10—10 of FIG. 9.

Turning now specifically to FIGS. 9 and 10, in order to achieve engagement of the serrated surface 66 with the engagement member 68, the pin 58 is moved to the second opening portion 44 by snap-fittingly transferring the pin 58 through the restriction element 48. In this regard, the restriction element 48 has a diameter less than the diameter of the pin 58, and since the temple bar 34 and side portion 30 of the lens assembly 24 are each fabricated from plastic, the pin can snap-fit into place. The restriction element 48 prevents the unwanted movement of the pin 58 from the second opening portion 44 back to the first opening portion 42; however, it should be noted that the pin 58 can be transferred easily back to the first opening portion 42 by applying a nominal force on the temple bar 34 by hand.

To assemble the lens assembly 24 with the temple bars 34, 36, the U-shaped 50 bodies of the temple bars receive their respective side portions 30, 32 between the legs 52, 54 of the bodies. Both of the temple bars 34, 36 are rotated counterclockwise approximately ninety degrees so that the pin 58 is aligned with the first opening portion 42 of the opening 40 and the detent portions 60, 62 are aligned with the second and the third opening portions 44, 46, respectively. The pin 58 and the detent portions 60, 62 are then inserted completely within the opening 40 and the temple bars 34, 36 rotated clockwise back to their operative positions.

At this point, the pins 58 of the temple bars 34, 36 are each moved from their respective first opening portions 42 to their respective second opening portions 44. The restriction elements 48 of the openings 40 prevent the movement of the pins 58 back to the first opening portions 42. In this position, the serrated surface 66 engages the engagement member 68 for enabling the independent angular adjustment of the temple bars 34, 36. It should be noted that the detent portions 60, 62 prevent the axial removal of the pin 58 from its respective opening 40.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In an eyeglass assembly having a rearwardly projecting side portion, a temple bar having a U-shaped body with inner and outer legs and a connecting leg disposed therebetween, and an angular adjustment construction for releasably and angularly mounting a temple bar to the side portion, said angular adjustment construction comprising:

an opening formed in the side portion, said opening having at least two side-by-side portions with a reduced dimension restriction element therebetween;

a pin formed on the outer leg of the U-shaped body of the temple bar and insertable within said opening, the pin being moveable in a first position from within one of the side-by-side portions to within an adjacent side-by-side portion, the restriction element restraining movement of the pin from within the adjacent side-by-side portion back within the one side-by-side portion in a second position;

a serrated surface formed on the rear edge of the side portion;

an engagement member formed on an inwardly facing surface of the connecting leg of the U-shaped body of the temple bar and constructed and arranged to engage the serrated surface in order to angularly adjust the temple bar; and wherein said engagement member of the temple bar engages the serrated surface of the side portion upon inserting the pin within the one of said at least two side-by-side portions and wherein moving the pin from the one of said at least two side-by-side portions through the restriction element to the adjacent side-by-side portion secures the pin and temple bar in place.

2. The construction set forth in claim 1, said at least two side-by-side portions including a first opening portion positioned adjacent the rear edge of the side portion and a second opening portion positioned adjacent the first opening portion along a generally horizontal axis.

3. The construction set forth in claim 2, said pin having a radially outwardly projecting detent portion extending along a generally vertical axis, said pin being received within the opening upon perpendicularly rotating the temple bar from its normal operating position in which it generally parallels said horizontal axis and aligning the pin with the first opening portion and the detent portion with the second opening portion, and, upon rotating the temple bar back to its operating position after the pin is received within the opening, the pin being snap-fittingly moved from the first opening portion to the second opening portion through said restriction element.

4. The construction set forth in claim 3, said restriction element having a diameter less than the diameter of the pin.

5. The construction set forth in claim 3, said at least two side-by-side portions further having a third opening portion adjacent the first opening portion and opposite the second opening portions.

6. The construction set forth in claim 5, said pin having another radially outwardly projecting detent portion generally opposite the detent portion, said another detent portion being aligned with the third opening portion upon inserting the pin and detent portions through their respective opening portions.

7. The construction set forth in claim 1, said serrated surface having a plurality of horizontally disposed serrations.

8. In an eyeglass assembly having a rearwardly projecting side portion, a temple bar having a U-shaped body with inner and outer legs and a connecting leg disposed therebetween, and an angular adjustment construction for releasably and angularly mounting a temple bar to the side portion, said angular adjustment construction comprising:

an opening formed in the side portion, said opening having at least two side-by-side portions with a reduced dimension restriction element therebetween;

a pin formed on the outer leg of the U-shaped body of the temple bar and insertable within said opening, the pin being moveable in a first position from within one of the side-by-side portions to within an adjacent side-by-side portion, the restriction element restraining movement of the pin from within the adjacent side-by-side portion back within the one side-by-side portion in a second position;

a serrated surface formed on one of the rear edge of the side portion and an inwardly facing surface of the connecting leg of the U-shaped body of the temple bar;

an engagement member formed on the other of the rear edge and the side portion of the inwardly facing surface of the connecting leg of the U-shaped body of the temple bar and constructed and arranged to engage the serrated surface in order to angularly adjust the temple bar; and wherein said engagement member engages the serrated surface upon inserting the pin within the one of said at least two side-by-side portions and wherein moving the pin from the one of said at least two side-by-side portions through the restriction element to the adjacent side-by-side portion secures the pin and temple bar in place.

9. An angular adjustment construction for releasably and angularly mounting a temple bar having a U-shaped body with inner and outer legs and a connecting leg disposed therebetween to an eyeglass assembly having a rearwardly projecting side portion, the angular adjustment construction comprising:

an opening formed in the side portion, said opening having at least two side-by-side portions with a reduced dimension restriction element therebetween;

a pin supported on a leg of the U-shaped body of the temple bar and insertable within said opening, the pin being moveable in a first position from within one of the side-by-side portions to within another of the side-by-side portions, the restriction element restraining movement of the pin from within the another side-by-side portion back within the one side-by-side portion in a second position;

a serrated surface formed on one of the rear edge of the side portion and a surface of the connecting leg of the U-shaped body of the temple bar;

an engagement member formed on the other of the rear edge of the side portion and the surface of the connecting leg of the U-shaped body of the temple bar and constructed and arranged to engage the serrated surface in order to angularly adjust the temple bar; and wherein said engagement member engages the serrated surface upon inserting the pin within the one of said at least two side-by-side portions so as to provide for angular adjustment of the temple bar and wherein moving the pin from the one of said at least two side-by-side portions through the restriction element to the adjacent side-by-side portion releasably secures the pin and temple bar in place.

10. The construction set forth in claim 9, said at least two side-by-side portions including a first opening portion positioned adjacent the rear edge of the side portion and a second opening portion positioned adjacent the first opening portion along a generally horizontal axis.

11. The construction set forth in claim 10, said at least two side-by-side portions further having a third opening portion adjacent the first opening portion and opposite the second opening portions.

* * * * *